(12) United States Patent  
Chapron et al.

(10) Patent No.: US 10,252,282 B2  
(45) Date of Patent: Apr. 9, 2019

(54) MIXER FOR DRAWING AND MIXING A SOLID PRODUCT WITH A LIQUID FROM A TANK OF A SPRAYER

(71) Applicant: EXEL INDUSTRIES, Paris (FR)

(72) Inventors: Fabien Chapron, Cercie (FR); Anthony Darrieutort, Montmerle sur Saone (FR)

(73) Assignee: EXEL INDUSTRIES, Paris (FR)

( * ) Notice: Subject to any disclaimer, the term of this patent is extended or adjusted under 35 U.S.C. 154(b) by 0 days.

(21) Appl. No.: 15/672,610

(22) Filed: Aug. 9, 2017

(65) Prior Publication Data

US 2017/0333928 A1    Nov. 23, 2017

Related U.S. Application Data

(63) Continuation of application No. PCT/FR2016/050300, filed on Feb. 10, 2016.

(30) Foreign Application Priority Data

Feb. 10, 2015    (FR) ..................... 15/51073

(51) Int. Cl.
*A01M 7/00* (2006.01)
*B01F 3/12* (2006.01)
(Continued)

(52) U.S. Cl.
CPC ......... *B05B 7/1436* (2013.01); *A01M 7/0092* (2013.01); *B01F 3/12* (2013.01);
(Continued)

(58) Field of Classification Search
CPC ...... B05B 7/1436; B01F 3/1271; B01F 5/043; B01F 5/248; B01F 5/106; B01F 3/12;
(Continued)

(56) References Cited

U.S. PATENT DOCUMENTS 1,355,507 A * 10/1920 Roever ............... F24B 15/007  
    209/250  
1,416,013 A *  5/1922 Gieseler ............... B65G 53/42  
    406/152

(Continued)

FOREIGN PATENT DOCUMENTS

WO    1995003240    2/1995

OTHER PUBLICATIONS

International Search Report for International Application PCT/FR2016/050300, dated Aug. 5, 2016.

(Continued)

*Primary Examiner* — Charles Cooley  
(74) *Attorney, Agent, or Firm* — Burris Law, PLLC

(57) ABSTRACT

A mixer for drawing and mixing a solid product, such as a powder, with a liquid from a tank includes a drawing wand which has a drawing tip suitable for drawing the product and a mixing vat which has a rotation shape delimited by a side wall. The discharge tip of the drawing wand leads into the top of a vat and injects the product into the vat. In one form, the mixer includes a hydraulic circuit designed to circulate the liquid between the tank and the vat. The circuit includes at least one injection duct having at least one injection nozzle that leads into the top of the vat so that the liquid from the tank flows over the side wall of the vat.

10 Claims, 1 Drawing Sheet

(51) Int. Cl.
  *B01F 5/04* (2006.01)
  *B01F 5/10* (2006.01)
  *B01F 5/24* (2006.01)
  *B05B 7/14* (2006.01)
  *B01F 15/02* (2006.01)

(52) U.S. Cl.
  CPC ............ *B01F 3/1271* (2013.01); *B01F 5/043* (2013.01); *B01F 5/106* (2013.01); *B01F 5/248* (2013.01); *B01F 15/0258* (2013.01); *B01F 2003/125* (2013.01)

(58) Field of Classification Search
  CPC ............ B01F 2003/125; B01F 15/0258; B01F 15/0238; A01M 7/0092
  USPC .......................... 366/139; 406/152, 176, 190
  See application file for complete search history.

(56) References Cited

U.S. PATENT DOCUMENTS

| | | | | |
|---|---|---|---|---|
| 2,453,465 A * | 11/1948 | Sloan | ........................ | B01F 5/02 366/136 |
| 2,724,580 A * | 11/1955 | Revallier | .............. | B01F 5/0057 366/165.1 |
| 2,744,286 A * | 5/1956 | Carpenter | ........... | B29C 37/0003 15/345 |
| 3,207,365 A * | 9/1965 | Bault | .................... | B01F 1/0022 222/1 |
| 3,262,318 A * | 7/1966 | Decker | .................... | G01N 1/08 406/152 |
| 3,273,401 A * | 9/1966 | Kaufmann | .............. | G01N 1/08 406/152 |
| 3,425,669 A * | 2/1969 | Gaddis | .................. | B01F 1/0011 366/153.1 |
| 3,561,733 A * | 2/1971 | Formeck | .................... | B01F 3/12 366/139 |
| 3,893,655 A * | 7/1975 | Sandiford | ............. | B01F 3/1271 366/114 |
| 4,445,809 A * | 5/1984 | Schmitz | ................. | B65G 53/42 406/152 |
| 4,498,819 A * | 2/1985 | El-Saie | .................. | B01F 5/0057 137/896 |
| 4,863,277 A * | 9/1989 | Neal | ...................... | B01F 3/1271 366/136 |
| 4,884,925 A * | 12/1989 | Kemp | .................... | B65G 53/30 366/165.1 |
| 4,955,723 A * | 9/1990 | Schneider | ........... | B01F 13/1013 366/136 |
| 5,211,475 A * | 5/1993 | McDermott | .......... | B01F 1/0022 222/133 |
| 5,344,619 A * | 9/1994 | Larwick | .................... | B01F 1/00 366/163.2 |
| 5,447,394 A * | 9/1995 | Shepard | ................. | B65G 53/30 406/109 |
| 5,676,494 A * | 10/1997 | Ruch | .................. | G01N 15/1404 406/152 |
| 6,039,470 A * | 3/2000 | Conwell | .................... | B01F 5/10 366/137 |
| 6,357,906 B1 * | 3/2002 | Baudoin | ............... | B01F 5/0206 366/136 |
| 2006/0164914 A1 * | 7/2006 | Goto | ........................ | B01F 3/12 366/165.2 |
| 2010/0050815 A1 * | 3/2010 | Heggset | ............... | B01F 3/1207 75/684 |
| 2014/0269153 A1 * | 9/2014 | Wells | .................. | B01F 15/0416 366/141 |
| 2017/0333928 A1 * | 11/2017 | Chapron | ................. | B01F 5/043 |

OTHER PUBLICATIONS

Powder & Liquid Delivery System Solidquid, Nov. 15, 2010, pp. 1-2, available at URL: http://www.hapman.com./images/brochures/brochure-solidquid.pdf.

* cited by examiner

MIXER FOR DRAWING AND MIXING A SOLID PRODUCT WITH A LIQUID FROM A TANK OF A SPRAYER

CROSS-REFERENCE TO RELATED APPLICATIONS

This application is a continuation of International Application No. PCT/FR2016/050300, filed on Feb. 10, 2016, which claims priority to and the benefit of FR 15/51073 filed on Feb. 10, 2015. The disclosures of the above applications are incorporated herein by reference.

FIELD

The present disclosure relates to an agricultural sprayer and more particularly to a mixer for mixing a solid product with a liquid coming from a vat of an agricultural sprayer.

BACKGROUND

The statements in this section merely provide background information related to the present disclosure and may not constitute prior art.

In the agricultural field, it is sometimes necessary to mix a liquid product contained in a vat of a sprayer, such as water, with a water-miscible solid product, for example a phytosanitary product, the obtained product being intended to be sprayed on cultures.

In general, the solid product to incorporate in the vat is packaged in a bag which is poured by the operator directly in the vat of the sprayer, via the manhole.

Such an operation is physically demanding and time-consuming because it requires the operator to bring the bag up to the manhole and manipulate it in order to pour it in the vat.

In addition, this incorporation operation presents a risk of environment pollution by spilling of a portion of the product by the side of the vat, as well as a risk of contact between the product and the operator, for example by splashing.

Also, it is observed that the operator agitates the bag above the vat in order to pour the last product residues. Such a gesture might promote the dispersion of the product in the air inhaled by the operator.

SUMMARY

The present disclosure provides a mixer for sucking and mixing a solid product, of a powdery type, with a liquid coming from a vat, characterized in that it includes:

a suction lance which has a suction tip adapted to suck said powdery product and a tip for discharging said product, a mixing basin which presents a shape of revolution delimited by a lateral wall, about a vertical axis of revolution, the basin extending axially from an upper portion delimited by a ceiling, down to a lower portion, the discharge tip of the suction lance opening into the upper portion of the basin so as to inject the product in the basin, a hydraulic circuit designed to make the liquid circulate between the vat and the basin, said circuit including at least one injection conduit which includes at least one injection nozzle opening into the upper portion of the basin so that the liquid coming from the vat flows on the lateral wall of the basin, and a discharge conduit which is adapted to link the lower portion of the basin on the vat, and a suction device for sucking the liquid which is arranged downstream of the basin, so as to suck the liquid and the product mixed together through the discharge conduit linked on the mixing basin.

Such a mixer according to the present disclosure allows limiting the manual operations of the operator by enabling him to directly suck the solid product to be mixed from the original container of the product, thanks to the suction lance.

In addition, the mixer allows obtaining a homogenous mixture of the liquid contained in the vat and of the solid product to incorporate before its introduction in said vat.

According to one form of the present disclosure, the nozzle for injecting the liquid extends generally tangentially to the axis of revolution of the basin, so as to inject the liquid on the wall of the basin by imparting a swirl movement to said liquid.

The swirling flow of the liquid allows promoting the mixture of the liquid with the solid product and especially the non-clogging of the powdery products on the walls of the basin.

According to another variant of the present disclosure, the nozzle for injecting the liquid presents a generally annular shape arranged about the axis of the basin, so as to inject the liquid on the wall of the basin by imparting a descending axial movement to said liquid.

In particular, this feature inhibits the liquid from rising in the suction lance via the discharge tip of said suction lance.

In another form, the basin presents a generally truncated-cone shape about the axis of revolution of the basin, the lower portion of the basin tapering towards the discharge conduit of the hydraulic circuit.

Such a truncated-cone shape promotes the mixture of the liquid and of the solid product as well as the flow and the discharge of the mixture to the lower end of the basin.

According to an aspect, the discharge tip of the suction lance opens axially into the ceiling of the basin so as to inject the product in the basin, the discharge tip projecting with respect to the ceiling of the basin so as to form a lip inhibiting the entry of liquid inside the lance.

In addition, the device for sucking the liquid includes a first inlet which is connected on the injection conduit, an outlet is connected on the vat and a second suction inlet which links the discharge conduit of the basin so as to create a vacuum in the basin by Venturi effect.

Also, the hydraulic circuit includes a device for driving the liquid contained in the vat, which is designed to drive the liquid through the hydraulic circuit.

In order to promote the suction of a powdery or granular product, the suction tip of the suction lance presents a flared shape.

Also, the suction tip of the suction lance presents, on one side, a linear edge forming a scraper for scraping the bottom of a container, and on the other side, an edge delimiting notches aiming to inhibit a flexible container from sticking to the suction tip by the suction effect.

According to another form of the present disclosure, the suction lance is detachably mounted on the basin, and the mixer includes a device for quick coupling of the discharge tip of the suction lance on the basin.

Finally, the mixer includes a liquid product incorporation device, which is linked on the upper portion of the basin via a conduit so as to enable the incorporation of an additional liquid product in the basin without the use of the suction lance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
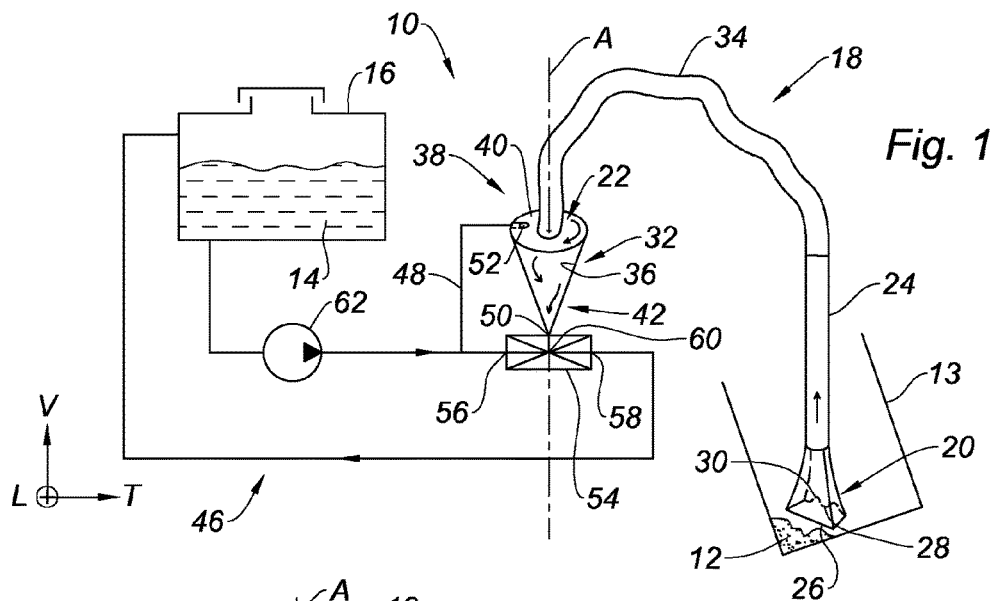
FIG. 1 is a schematic overview, which illustrates a mixer including a mixing basin and a lance for sucking the solid product, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the expressions "higher", "lower" and their derivatives will be used without limitation to refer respectively to the upper portion and to the lower portion of FIGS. 1 to 5.

In addition, in order to clarify the description and the claims, the terms longitudinal, vertical and transverse will be adopted without limitation with reference to the trihedron L, V, T indicated in the figures.

It is noteworthy that in the present patent application, the terms "upstream" and "downstream" should be understood with reference to the circulation of the fluids and solids through the mixer.

In the different variants, the same reference numerals may be used for elements which are similar or provide common functions for simplification of the description.

In FIG. 1, there is represented a mixer 10 for mixing a solid product 12 contained in a bag 13, with a liquid 14 coming from a vat 16, for example a vat of an agricultural sprayer, in order to obtain a sprayable liquid mixture.

Solid product 12 means all products of a powdery, granular, in shavings or in sequins type. In particular, it may consist of a water-miscible fertilizer.

The mixer 10 includes a suction lance 18 which extends from a suction tip 20 adapted to suck the product 12, up to a discharge tip 22 of the sucked product.

The suction tip 20 of the lance 18 is mounted at the end of a manipulating arm 24 which is adapted to be manipulated by the operator to suck the product 12 contained in the bag 13.

To this end, the suction tip 20 has a flared shape enlarged at its free end so as to promote the suction of the product 12.

In addition, as shown in FIG. 1, the suction tip 20 has a free end with a generally rectangular section which is delimited by a first linear edge forming a scraper 26 for scraping the bottom of the bag 13.

Advantageously, the suction tip 20 has a second linear edge 28 which delimits notches 30 aiming to inhibit the flexible bag 13 from sticking to the suction tip 20 by the suction effect.

The discharge tip 22 of the lance 18 is linked on a mixing basin 32 via a flexible conduit 34 which links the manipulating arm 24 of the lance 18.

In one form of the present disclosure, the inner wall of the arm 24 and that of the associated conduit 34 are smooth and devoid of asperities, so as to promote the suction and the non-clogging of the product 12 when these walls are wet.

The mixing basin 32 presents a truncated-cone shape of revolution about a vertical axis A of revolution.

Referring to FIG. 1, the basin 32 is delimited by a truncated-cone shaped lateral wall 36 flared upwardly, the basin 32 extending axially from an upper portion 38 delimited by a ceiling 40, down to a lower portion 42 with a narrowed section.

Figure 2:
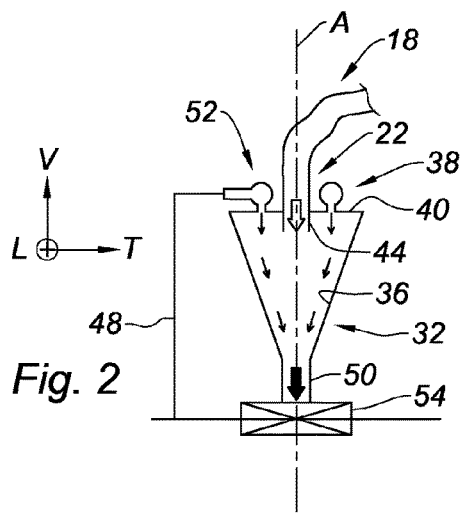
FIG. 2 is a schematic sectional detail view, which illustrates a variant of the basin of FIG. 1.

As shown in FIG. 2, the discharge tip 22 of the suction lance 18 opens axially into the ceiling 40 of the upper portion 38 of the basin 32, generally at the center of the ceiling 40, so as to inject the product 12 in the basin 32.

Advantageously, the discharge tip 22 of the lance 18 projects axially with respect to the ceiling 40 of the basin 32, inside the basin 32, so as to form a lip 44 inhibiting the entry of liquid inside the lance 18.

According to another aspect, the mixer 10 includes a hydraulic circuit 46 which is designed to make the liquid 14 circulate between the vat 16 and the basin 32.

In this form, the circuit 46 includes an injection conduit 48 which links the vat 16 on the upper portion 38 of the basin 32 and a discharge conduit 50 which links the lower portion 42 of the basin 32 on the vat 16.

According to one form of the present disclosure represented in FIG. 1, the injection conduit 48 includes an injection nozzle 52 which opens into the upper portion 38 of the basin 32 and which extends generally tangentially to the axis A of revolution of the basin 32, so as to inject the liquid 14 on the wall 36 of the basin 32 by imparting a swirl movement to the liquid 14.

Thus, by the combined effect of the terrestrial gravity and the orientation of the injection nozzle 52, the liquid 14 coming from the vat 16 swirls against the wall 36 of the basin 32 while descending down to the lower portion 42 of the basin 32.

In a complementary manner, the discharge conduit 50 opens axially at the truncated-cone shaped lower end of the basin 32 so as to collect the liquid 14.

In addition, a suction device 54 for sucking the liquid is arranged downstream of the discharge conduit 50, so as to suck the liquid 14 and the product 12 mixed together through the mixing basin 32.

The Venturi-type suction device 54 includes a first inlet 56 which is connected on the injection conduit 48, an outlet 58 which is connected on the vat 16 and a second suction inlet 60 which links the discharge conduit 50 of the basin 32.

The second inlet 60 of the suction device 54 creates a vacuum by Venturi effect, which allows setting the basin 32 in vacuum so as to suck the mixture contained in the basin 32 and to suck the product 12 through the suction lance 18.

Furthermore, the hydraulic circuit 46 is equipped with a pump 62 which is arranged on the injection conduit 48, upstream of the basin 32, so as to drive and pressurize the liquid through the hydraulic circuit 46.

An example of the operation of the mixer 10 is described hereinafter.

As a first step, the pump 62 is set in operation to drive the liquid in the hydraulic circuit 46 and to create a sufficient pressure upstream of the suction device 54.

When passing through the suction device 54, the liquid generates a vacuum in the basin 32.

Also, the liquid 14 coming from the vat 16 is injected in the basin 32 via the injection nozzle 52 provided, the liquid creating a swirl and a cyclonic effect in the basin 32.

After having opened the bag 13 containing the product 12 to incorporate, the operator introduces the suction lance 18 directly in the bag 13, the lance 18 sucking the product 12 by the effect of the vacuum generated in the basin 32.

Depending on the texture of the product 12, it may be desired to agitate the suction lance 18 in the bag to "fluidify" the product 12 in order to enable the suction thereof.

In order to draw the bottom of the bag 13, all it needs is to tilt the bag manually and orientate the suction tip 20 of the lance 18 in the lower corner of the bag 13.

In the case of a bag 13 made of paper, it may be desired to scrape the bottom of the bag with the scraper 26 of the suction tip 20 in order to leave as little as possible of residual product.

According to a variant of the present disclosure represented in FIG. 2, the nozzle 52 for injecting the liquid 14 in the basin 32 presents a generally annular shape which opens axially into the ceiling 40 of the basin 32, so as to inject the liquid 14 on the wall of the basin 32 by imparting a descending axial movement to the liquid 14, as illustrated by the arrows in FIG. 2.

The annular injection nozzle 52 is centered along the axis A of revolution of the basin 32, so that the discharge tip 22 of the suction lance 18 opens at the middle of the injection nozzle 52.

This variant allows avoiding wetting the discharge tip 22 of the suction lance 18.

Figure 5:
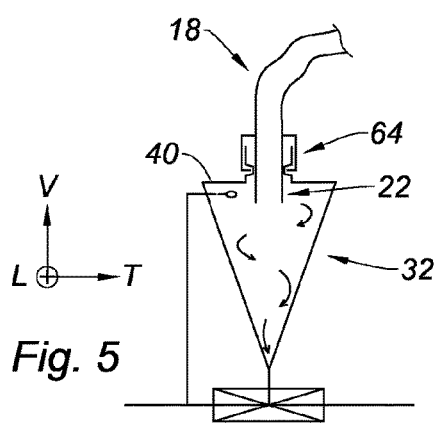
FIG. 5 is a schematic sectional detail view, which illustrates a device for quick coupling of the discharge tip of the suction lance on the basin, according to a variant of the present disclosure.

According to another variant represented in FIG. 5, the suction lance 18 is detachably mounted on the basin 32.

To this end, the mixer 10 includes a coupling device 64 for quick coupling by form-fitting of the discharge tip 22 of the suction lance 18 on the ceiling 40 of the basin 32.

The quick coupling device 64, which is for example of the form-fitting nesting type, is airtight so as to allow setting the suction lance 18 in vacuum.

Figure 3:
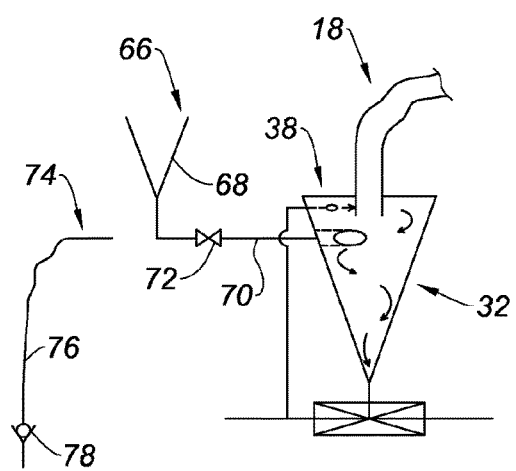
FIG. 3 is a schematic sectional detail view, which illustrates the mixer of FIG. 1 equipped with a hopper for incorporating a liquid product.

According to another form of the present disclosure represented in FIG. 3, the mixer 10 includes a liquid product incorporation device 66, which is linked on the upper portion 38 of the basin 32 so as to enable the incorporation of an additional liquid product in the basin 32.

The incorporation device 66 includes for example an incorporation hopper 68, a conduit 70 which links the hopper 68 on the basin 32 and a shut-off valve 72 which is stitched on the conduit 70.

In addition, the conduit 70 opens into the basin 32 so as to disturb as little as possible the flow of the liquid 14 coming from the vat 16 into the basin 32.

According to a variant of the present disclosure, the conduit 70 opens into the basin 32 between the ceiling 40 of the basin 32 and the quick coupling device 64, in order not to disturb the flow of the liquid 14.

The incorporation device 66 allows incorporating an additional liquid to the liquid 14 contained in the vat 16, simultaneously or not with the solid product 12.

Figure 4:
FIG. 4 is a schematic sectional detail view, which illustrates the mixer of FIG. 1 equipped with a stick for sucking a liquid product.

In a non-limiting manner, the incorporation device 66 may include an incorporation stick 74 represented in FIG. 4.

The stick 74 links the basin 32 via a flexible hose 76 equipped with a check valve 78 and a shut-off valve, so as to allow sucking a liquid from a container (not represented), such as a tank, up to the basin 32.

The present description of the present disclosure is given as a non-limiting example.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A mixer for sucking and mixing a solid product, of a powdery type, with a liquid coming from a vat, the mixer comprising:
    a suction lance having a suction tip adapted to suck said product and a discharge tip for discharging said product;
    a mixing basin defining a shape of revolution delimited by a lateral wall, about a vertical axis of revolution, the basin extending axially from an upper portion delimited by a ceiling down to a lower portion, the discharge tip of the suction lance opens into the upper portion of the basin such that the product is injected into the mixing basin;
    a hydraulic circuit operable to circulate the liquid between the vat and the basin, said circuit including at least one injection conduit having at least one injection nozzle that opens into the upper portion of the basin such that the liquid from the vat flows on the lateral wall of the basin, said circuit further including a discharge conduit adapted to link the lower portion of the basin to the vat; and
    a suction device for sucking the liquid downstream of the basin such that the liquid and the product mixed together is sucked through the discharge conduit linked on the mixing basin; and
    a coupling device disposed on the mixing basin for quick coupling of the discharge tip of the suction lance to the basin such that the suction lance is detachably mounted to the basin.

2. The mixer according to claim 1, wherein the at least one injection nozzle extends tangentially to the vertical axis of revolution of the basin and operable to inject the liquid on the wall of the basin by imparting a swirl movement to said liquid.

3. The mixer according to claim 1, wherein the at least one injection nozzle defines an annular shape arranged about the axis of the basin and operable to inject the liquid on the wall of the basin by imparting a descending axial movement to said liquid.

4. The mixer according to claim 1, wherein the basin defines a truncated-cone shape about the axis of revolution of the basin, the lower portion of the basin tapering towards the discharge conduit of the hydraulic circuit.

5. The mixer according to claim 1, wherein the discharge tip of the suction lance opens axially into the ceiling of the basin so as to inject the product in the basin, the discharge tip projecting with respect to the ceiling of the basin so as to form a lip inhibiting the entry of liquid inside the lance.

6. The mixer according to claim 1, wherein the suction device includes a first inlet connected to the injection conduit, an outlet connected to the vat, and a second suction inlet linked to the discharge conduit of the basin such that it creates a vacuum in the basin by Venturi effect.

7. The mixer according to claim 1, wherein the hydraulic circuit includes a driving device for driving the liquid in the vat through the hydraulic circuit.

8. The mixer according to claim 1, wherein the suction tip of the suction lance defines a flared shape adapted to promote the suction of the product.

9. The mixer according to claim 1, wherein one side of the suction tip of the suction lance defines a linear edge forming a scraper for scraping a bottom of a container, and the other side of the suction tip defines an edge delimiting notches to inhibit a flexible container from sticking to the suction tip by a suction effect.

10. The mixer according to claim 1 further comprising an incorporation device for incorporating a liquid product, which is linked on the upper portion of the basin via a conduit so as to enable the incorporation of an additional liquid product in the basin.

* * * * *